United States Patent Office 2,811,555
Patented Oct. 29, 1957

2,811,555

REDUCTION OF 2-NITROSO-5-DIETHYL-AMINOTOLUENE

Henri Larive, Clichy, and Jean Pierre Sarrut, Paris, France, assignors to Eastman Kodak Company, Rochester, N. Y., a corporation of New Jersey No Drawing. Application May 2, 1955, Serial No. 505,516

1 Claim. (Cl. 260—580)

The present invention relates to a method of preparing aromatic diamines from nitrosoanilines.

It is known that phenylenediamines and toluylenediamines, such as p-aminodiethylaniline and 2-amino-5-diethylaminotoluene are photographic developers that are particularly useful for color photography. The method used up to now, for example, to prepare 2-amino-5-diethylaminotoluene, consists in beginning with N,N-diethyl-m-toluidine which is subjected to nitrosation, followed by a chemical reduction by means of zinc in an acid medium. This is then neutralized in order to liberate the free base, which is extracted by means of benzene or toluene, and the base is then submitted to distillation in vacuum. Then, it is precipitated and the hydrochloride is separated from the base by adding the latter to a mixture of hydrochloric acid and acetone.

Such a process presents disadvantages. In the first place, reduction under the aforementioned conditions, which is done in a very dilute medium, requires a cumbersome and complicated set-up which is, therefore, expensive. Moreover, in the course of the chemical reduction there is always the formulation of by-products that impede the subsequent operations. Furthermore, in the course of the extraction by means of benzene or toluene, oxidation of the free base occurs, which reduces the final yield.

It is also known that certain dialkyl-p-aminoanilines can be prepared by nitrosating dialkylanilines and reducing the nitrosated derivatives by means of catalytic hydrogenation, using Raney nickel as the catalyst, treating the nitrosated derivative in solution. This method does not present certain of the aforementioned disadvantages, but the catalytic reduction of the nitrosated derivative in solution using nickel catalyst also requires a cumbersome and complicated set-up, and the quantity of catalyst that has to be used is relatively large.

The method, according to the invention for the preparation of aromatic diamines, is characterized especially in that an aniline is nitrosated in such a way as to separate the corresponding nitrosoaniline in the state of a free base, and this latter compound is submitted to a catalytic hydrogenation in the molten state, or in a solution using a palladium catalyst.

It is, therefore, an object of our invention to provide an improved method for reducing nitrosoaniline compounds in the molten state. Another object is to provide an improved method for reducing nitrosoaniline compounds under certain conditions while in a dissolved state. Other objects will become apparent from a consideration of the following description and examples.

Contrary to all expectations, it was found, in fact, that certain nitrosoanilines can be crystallized and are quite stable at the temperatures that are required for the catalytic hydrogenation in the molten state.

The nitrosoanilines which can be reduced or hydrogenated according to our invention comprise those represented by the following general formula:

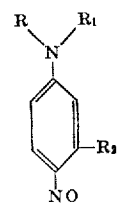

wherein R represents a lower alkyl group, such as methyl, ethyl, etc., $R_1$ represents a lower alkyl group, such as R, or a lower alkylsulfonamidoethyl group, such as β-(methylsulfonamido)ethyl, β-(ethylsulfonamido)ethyl, etc., and $R_2$ represents a hydrogen atom or a methyl group.

The catalyst employed for molten state reduction is a member of the nickel family of group VIII of the periodic table, i. e., nickel, palladium or platinum. For the hydrogenation in the solution state, palladium is employed.

Raney nickel that is freshly prepared in a known manner, starting with an alloy of 50% nickel and 50% aluminum can be used as the hydrogenation catalyst. It is preferred, however, to use palladium or alumina (50% of the weight of the catalyst), or other inert carrier, because of its noninflammability and its remarkable activity. The concentration of catalyst varies according to the apparatus used.

The temperature for the hydrogenation will vary, depending on whether a molten state or solution hydrogenation is employed. For hydrogenation in the molten state, a temperature high enough to melt the nitrosoaniline compound should be employed, but not so high as to cause decomposition thereof. The upper limit will, of course, vary with the compound being hydrogenated. In a solution hydrogenation the temperature will generally vary from about ambient temperature (i. e., about 25° C.) to the boiling point of the solvent. Suitable solvents include the lower saturated aliphatic alcohols, e. g., methanol, ethanol, isopropanol, propanol, etc.

The hydrogen pressure can vary from about 100 p. s. i. to about 1500 p. s. i., or higher.

The preparation of three compounds by means of the method according to the invention is given in the following examples:

EXAMPLE I

*Preparation of p-amino-N,N-diethylaniline*

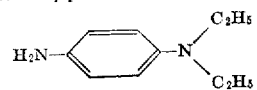

NITROSATION OF N,N-DIETHYLANILINE 500 cc. of concentrated hydrochloric acid were placed in a 2-liter beaker that was provided with an agitator, a thermometer and a dropping funnel, the tube of which almost reached down to the bottom of the beaker. This was chilled by packing ice around the outside of it. 500 g. of crushed ice was then added. The temperature dropped to −15° C. 200 g. (1.33 mol.) of diethylaniline were then poured in while agitating vigorously. The solution became clear again and a solution of 100 g. of sodium nitrite in 250 cc. of water was added. This addition was made just as quickly as the chilling permitted, because the temperature should not exceed +5°, and the liberation of nitrous gases should be avoided; ice was added as necessary.

Agitation was continued for a half an hour after completion of the addition. There was precipitation of yellow flakes of the hydrochloride of the nitrosated derivative. This mixture was then neutralized by means of concentrated ammonia (from 300 cc. to 400 cc.), which caused the precipitation of the base of the nitrosated derivative in green flakes. After half an hour, the product was collected on a Buchner funnel, washed with a little water and dried in the air (or in vacuum). The yield was quantitative, from 230 g. to 240 g. of 4-nitroso-N,N-diethylaniline being obtained.

REDUCTION OF THE 4-NITROSO-N,N-DIETHYL-ANILINE IN THE MOLTEN STATE 240 g. of the preceding nitrosated derivative were placed in a hydrogenation bomb with 4 g. of 5% palladized carbon catalyst and this was heated to from 85°–95° C. It was put under hydrogen pressure, and the reduction was complete in less than a half-hour. It was allowed to cool, the mixture was collected, washed with a little methanol (or benzene) and filtered to separate the catalyst. The oil was distilled immediately, and the fraction passing off at 120°–125° C. under 4 to 5 mm. of mercury was collected. The yield of the distilled product was 90%.

The catalyst collected by filtration showed the same activity in two other successive preparations.

EXAMPLE II

*Preparation of the hydrochloride of 2-amino-5-diethylaminotoluene*

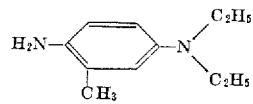

NITROSATION OF N,N-DIETHYLMETATOLUIDINE

A solution of 10 g. of N,N-diethyl-m-toluidine, 60 cc. of water and 15 cc. of concentrated sulfuric acid was cooled down to 10° C. by means of crushed ice. While agitating vigorously, a solution of 6 g. of sodium nitrite in 10 cc. of water was added drop by drop, while keeping the temperature below 30° C. Agitation was continued for thirty minutes after completion of the addition, and any possible excess of nitrite was destroyed by means of sulfamic acid. While agitating, a dilute solution of caustic soda was added gradually to neutralize any excess of acid. Consequently, the 2-nitroso-5-diethylaminotoluene precipitated almost immediately. It was drained, washed in ice water and allowed to dry at ordinary room temperature. The product was perfectly stable and did not decompose appreciably below 90° C.

REDUCTION OF THE 2-NITROSO-5-DIETHYLAMINO-TOLUENE IN THE DISSOLVED STATE

This method of carrying out the invention is given for comparison in order to show the advantages of the method according to the invention. 76.8 g. (10.4 mol.) of the nitroso derivative were put in suspension in 125 cc. of ethyl alcohol, with 20 g. of freshly prepared Raney nickel that was kept in water. At room temperature, the suspension was placed in a hydrogenation bomb of about one liter, of the shock type, that was provided with a perforated diaphragm to help the agitation. Hydrogen was introduced up to a pressure of 50 kg. per sq. cm. and agitation was begun. The hydrogen was absorbed very rapidly and the pressure decreased and it then stayed at a value of about 30 kg. per sq. cm. The temperature rose to 70° C. The catalyst was separated by filtration, avoiding contact with the air so that it could be used for another hydrogenation.

The theoretical quantity of anhydrous, gaseous hydrochloric acid was added to the alcohol solution. A precipitate was formed and washed on a filter with acetone. In this way 74 g. of almost white crystals of 2-amino-5-diethylaminotoluene hydrochloride were obtained, which was a yield of 87%.

The catalyst that had been separated was used for other reductions. However, since the speed of hydrogenation has a tendency to decrease, it is generally preferred to add a certain quantity of fresh catalyst. 4 g. is enough for 76 g. of nitroso derivative, and in this way ten successive reductions were carried out. The proportion of catalyst used is, in this way, about 5% of the weight of the product to be hydrogented.

REDUCTION OF THE 2-NITROSO-5-DIETHYLAMINO-TOLUENE IN THE MOLTEN STATE 15 g. of 2-nitroso-5-diethylaminotoluene in the molten state was reduced in the presence of 0.1 g. of a catalyst of 5% palladium on alumina (or on carbon). This was cooled to keep the temperature below 80° C. and thus avoid partial decomposition of the nitroso derivative. In this way the base was obtained with a yield of 95%.

Ten successive reductions were carried out by adding, each time, 0.01 g. of fresh catalyst. The quantity of noble metal used was therefore about 7 parts per thousand, which is less than for the catalytic hydrogenation in a dissolved state.

The hydrochloride was obtained by dissolving the base in acetone and by precipitating it out cold by means of a 32% aqueous solution of hydrochloric acid. The crystals were separated and washed in acetone.

EXAMPLE III

*Preparation of the hydrochloride of N-ethyl-N-β-(methylsulfonamido)ethyl-3-methyl-4-aminoaniline*

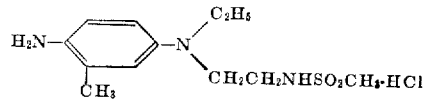

This compound was obtained as follows:

(1) N-ethyl-m-toluidine was reacted with formaldehyde, sodium bisulfite, sodium cyanide and water to give N-ethyl-N-β-cyanomethyl-m-toluidine.

(2) N-ethyl-N-β-cyanomethyl-m-toluidine was hydrogenerated in the presence of Raney nickel and liquid ammonia, under pressure and at 85–90° C. to give N-ethyl-N-β-aminoethyl-m-toluidine.

(3) N-ethyl-N-β-aminoethyl-m-toluidine was reacted with methanesulfonyl chloride to give N-ethyl-N-β-(methylsulfonamido)ethyl-m-toluidine.

(4) The product of step 3 was nitrosated as described in Example I to give N-ethyl-N-β-(methylsulfonamido)-ethyl-4-nitroso-3-methylaniline.

(5) The product of step 4 was dissolved in isopropyl alcohol and a slurry consisting of water and palladium on alumina catalyst (Baker & Co.) added. While the temperature was maintained at 40–45° C. by cooling, hydrogen was introduced at 200 p. s. i. until hydrogen absorption ceased. The catalyst was filtered off and hydrochloric acid gas passed into the filtrate until precipitation ceased. The mixture was then filtered, yielding substantially pure product having the above formula. (U. S. 2,193,015.)

In a similar manner, other nitrosoaniline compounds selected from those represented by the above general formula can be reduced to the corresponding diamine compounds. The process of our invention can be carried out batch-wise or in a continuous fashion. In general, we have found that the molten state hydrogenation (i. e., in the absence of solvents) offers advantages over the particular solution method herein described in that the yields of product are generally higher, the products are purer, and more compact and less bulky equipment can be utilized.

What we claim as our invention and desire secured by Letters Patent of the United States is:

A process for preparing 2-amino-5-diethylaminotoluene consisting in heating 2-nitroso-5-diethylaminotoluene to a molten state but to a temperature below 80° C., (2) contating said nitroso compound with hydrogen at a pressure of from 100 to 1500 p. s. i. in the presence of metallic palladium for a time sufficient to reduce at least a portion of said nitroso compound to 2-amino-5-diethylaminotoluene, and (3) thereafter separating said metallic palladium from the reaction mixture.

(References on following page)

References Cited in the file of this patent

UNITED STATES PATENTS

| | | |
|---|---|---|
| 2,292,879 | Kise | Aug. 11, 1942 |
| 2,458,214 | Souders | Jan. 4, 1949 |
| 2,552,241 | Weissberger et al. | May 8, 1951 |
| 2,592,364 | Weissberger et al. | Apr. 8, 1952 |

FOREIGN PATENTS

| | | |
|---|---|---|
| 667,059 | Great Britain | Feb. 20, 1952 |

OTHER REFERENCES

Weygand: Organic Preparations, p. 223, Interscience Publishers, Inc., New York, N. Y., 1945.

UNITED STATES PATENT OFFICE

CERTIFICATE OF CORRECTION

Patent No. 2,811,555

Henri Larive et al.

October 29, 1957

It is hereby certified that error appears in the printed specification of the above numbered patent requiring correction and that the said Letters Patent should read as corrected below.

Column 4, lines 34 and 35, Example III, for "hydrogenerated" read -- hydrogenated --; lines 67 and 68, for "contating" read -- contacting --.

Signed and sealed this 31st day of December 1957.

(SEAL)
Attest:

KARL H. AXLINE
Attesting Officer

ROBERT C. WATSON
Commissioner of Patents